Aug. 22, 1939.  D. R. HILLIS  2,170,327
COMBINED ALTERNATING PUMP AND CONTROL VALVE
Filed Oct. 20, 1936  2 Sheets-Sheet 2

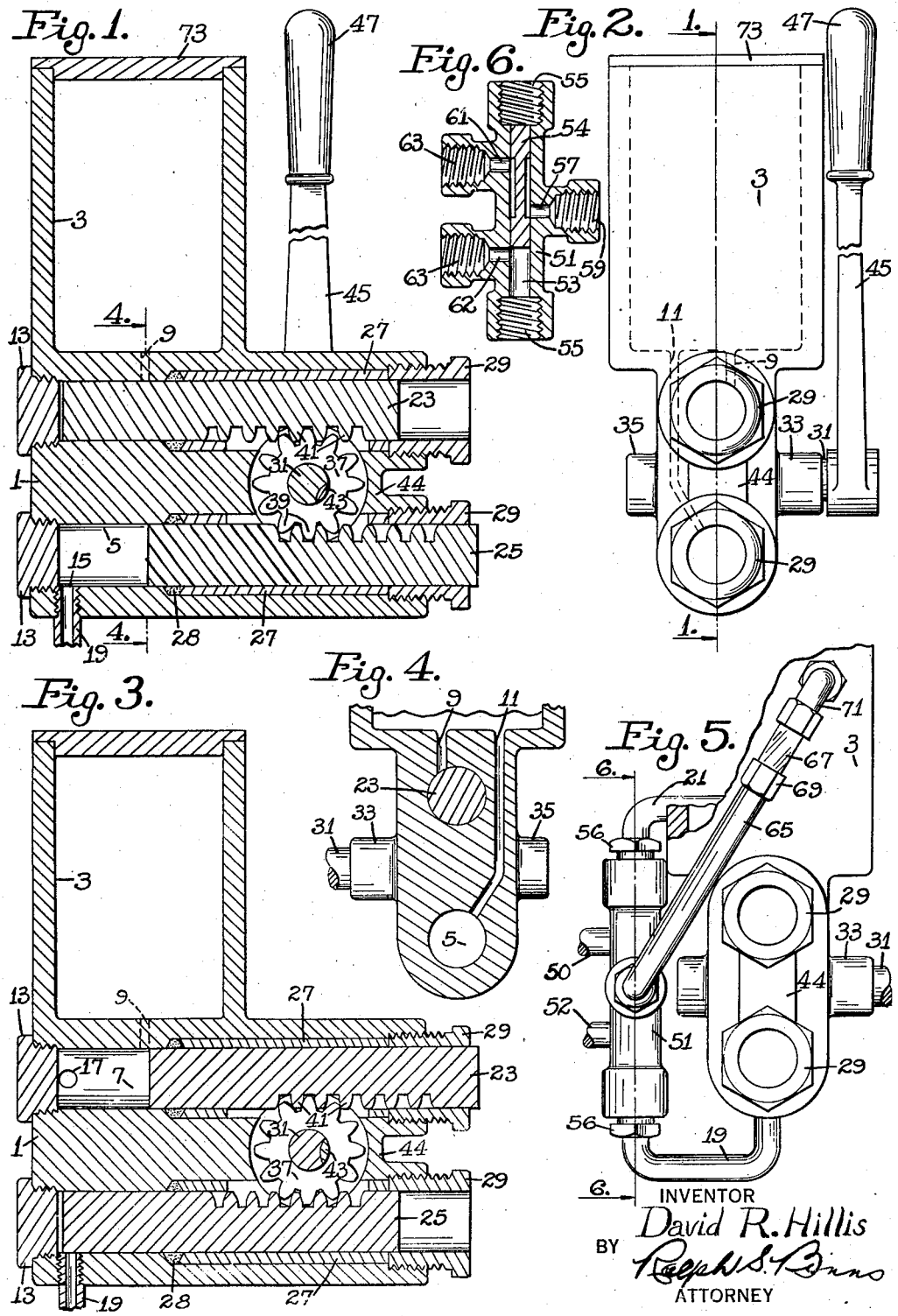

INVENTOR.
David R. Hillis.
BY
ATTORNEY.

Patented Aug. 22, 1939

2,170,327

UNITED STATES PATENT OFFICE 2,170,327

COMBINED ALTERNATING PUMP AND CONTROL VALVE

David R. Hillis, Detroit, Mich., assignor to Trabon Engineering Corporation, Cleveland, Ohio, a corporation of Ohio Application October 20, 1936, Serial No. 106,556

9 Claims. (Cl. 184—7)

My invention pertains to a fluid circulating device for use in single line flow-reversing systems for distributing lubricant or other fluids and more particularly my invention pertains to a combined alternating pump and control valve for use in such systems.

It is an object of my invention to provide an alternating pump and an automatically operated flow control valve of simple construction for use in single line flow-reversing systems for distributing predetermined quantities of lubricant or other fluid.

It is also an object of my invention to provide an alternating pump in combination with a flow indicating device and an automatically operated flow control valve, the entire combination being used for supplying fluid reversely into opposite ends of a single line system whilst returning the by-passed fluid from the other end thereof through the flow indicating device.

My invention, however, both as to its organization and its method of operation, together with additional objects and advantages thereof, will best be understood from the following description of a specific embodiment, when read in conjunction with the accompanying drawings, where like reference characters are used throughout to designate similar parts and in which:

Fig. 1 is a sectional view through my fluid circulating pump taken on line 1—1 of Fig. 2, Fig. 2 is an end elevational view of my fluid circulating pump, Fig. 3 is a view similar to Fig. 1 showing the moving elements of the pump in different operative positions, Fig. 4 is a fragmentary sectional view on line 4—4 of Fig. 1;

Fig. 5 is an end elevational view of my fluid circulating pump assembly comprising the flow indicator, and the device for connecting the discharged fluid into and returning it from the distributing system; and Fig. 6 is a vertical sectional view through the automatic flow controlling device, on line 6—6 of Fig. 5;

Figure 7:
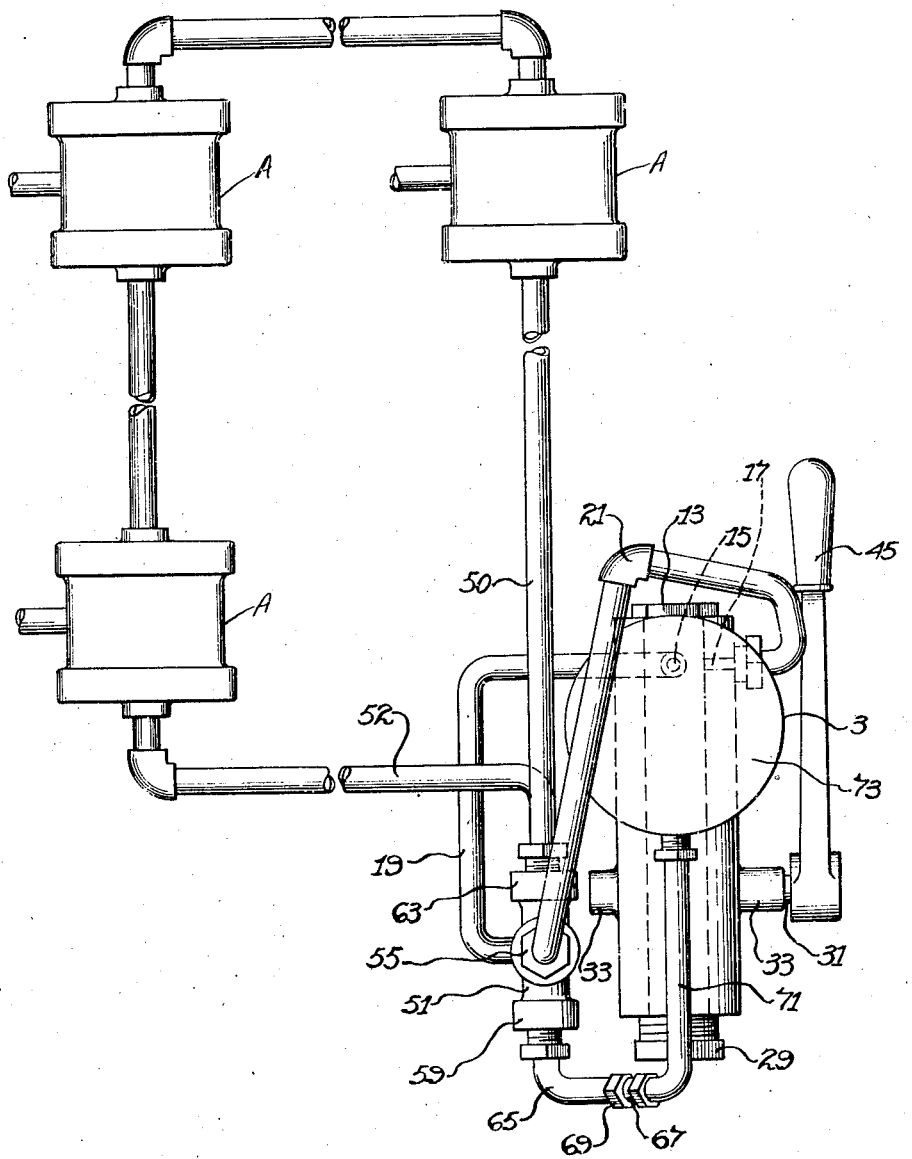
Fig. 7 is a plan view of the apparatus of Fig. 5 illustrating its connection with the service line.

Referring more particularly to Figs. 1, 2 and 3 of the drawings, my fluid circulating pump comprises a body 1 having a fluid storage reservoir 3 which is formed integrally on the upper portion thereof and having a pair of piston guiding apertures 5 and 7 which extend through the lower portion of the body in substantially parallel relation spaced vertically under the reservoir. For conducting fluid from the reservoir 3 into the piston guiding apertures, fluid conducting passages 9 and 11 extend downwardly therefrom and connect respectively into the side walls of the upper and the lower piston guiding apertures 7 and 5 at intermediate points substantially under the middle of the reservoir. The adjacent ends of the piston guiding apertures at the left hand side of the body are counter-bored and internally threaded to receive plugs or closure members 13 for closing the ends of the apertures. At adjacent points, near the inner ends of the closure plugs 13 discharge ports 15 and 17 extend from the bottom and side walls of the piston guiding apertures 5 and 7 respectively for connection through conduits 19 and 21 respectively.

Pistons 23 and 25 are slidably disposed within the piston guiding apertures 7 and 5 respectively. Both apertures are counter-bored from the end at the right hand side of the body to adjacent the inlet passages 9 and 11 to provide a larger diameter to receive guide sleeves 27 which are slipped into the apertures from the right hand in concentrically disposed relation around the pistons. The innermost ends of the guide sleeves 27 are tapered inwardly for compressing any suitable packing material or gasket 28 against the inner end of the counter-bore and against the side walls of the piston. The right hand end of each aperture is provided with a larger counter-bore which is internally threaded for receiving a hollow externally threaded packing nut 29 which abuts the outermost end of each guide sleeve 27 whereby the latter may be adjustably compressed against the packing 28 to provide the necessary degree of pressure therein for hermetically sealing the piston 23 and 25 as they slide in the apertures.

For manually operating my fluid circulating pump, it is provided with a shaft 31 which passes transversely through the body 1 between the piston guiding apertures 5 and 7 and is journalled in bearings 33 and 35 disposed on opposite sides of the body. An intermediate portion of the body around the shaft and between the pistons 23 and 25 and bearings 33 and 35 is cut out to provide a cavity for receiving a gear wheel 37 having suitable teeth 39 for engaging teeth 41 which are suitably provided on the adjacent sides of the slidable pistons. The gear wheel 37 is secured firmly to the shaft 31 in any suitable manner as by a Woodruff key 43 and it is of a suitable diameter for meshing simultaneously with the piston actuating teeth on opposite sides thereof. To facilitate installing the gear wheel 37 on the shaft 31 in the body, a removable closure 44 is provided in the body between the piston apertures 5 and 7 at the right hand side of the body. One end of the shaft 31 extends beyond the bearing 33 to receive a crank 45 which is suitably keyed thereto and comprises a manually actuable handle 47 adapted to move in the arc of a circle adjacent the side of the reservoir 3 for imparting an oscillatory movement to the shaft.

The gear wheel 37 is adapted to be oscillated by actuation of the handle 47 thereby simultaneously driving the slidable pistons 23 and 25 in opposite directions in their respective apertures. As the piston 23 is moved to the right to its extreme position, as shown in Fig. 3, it uncovers the port connecting through the passage 9 from the reservoir 3 and the fluid from the reservoir is sucked into the space in the left hand end of the aperture. As the piston 23 is now driven in the opposite direction, it forcefully drives the fluid out of the discharge outlet 17 at the end of the aperture. The other piston 27 is reciprocated simultaneously and it alternately draws fluid from the storage reservoir 3 through the interconnected passage 11 and discharges it through the discharge outlet 15.

The single service line is illustrated in Fig. 7, with its local feeder units A, A, A, and having its ends designated 50 and 52 respectively.

The fluid discharged from the outlet 17 is delivered through the conduit 21 to the end 50, and that discharged from the outlet 15, through the conduit 19, to the end 52, of the service line. When fluid is discharged from either one of said outlets into its respective end of the service line the other end of said line is automatically connected to the reservoir 3 to return the by-passed fluid to said reservoir. For this purpose there is provided a control device which comprises a tubular body 51 having a valve guiding aperture 53 which extends axially therethrough. Each end of the piston guiding aperture 53 is counterbored to a larger diameter and is internally threaded to provide pipe-fittings 55 for connection with the discharge outlets 15 and 17 of the pump through conduits 19 and 21. A discharge port 57 which is connected from the middle of the valve guiding aperture 53 is provided at its outer end with a pipe fitting 59. On the opposite side of the tubular body 51, I provide a pair of line connecting ports 61 and 62 which are provided externally with suitable pipe-receiving fittings 63 for connection with the opposite ends 50 and 52 of said service line. Within the valve guiding aperture 53, I provide a dumb-bell valve piston 54 for slidable movement therein to selectively connect either line port 61 or 62 with the discharge port 59. The pipe fittings limit the valve movement.

The tubular body 51 is mounted on the side of my fluid circulating pump by connecting the conduits 21 and 19 respectively into the pipe fittings 55 at the upper and lower ends of the valve guiding aperture. Pipe gripping nuts 56 may be threaded into the pipe fittings 55 for securing the pipes therein or the pipes may be directly threaded therein as will be readily understood. From the discharge port 57, a fluid receiving conduit 65 extends to a fluid flow indicator 67 comprising a glass tube which is connected by means of a suitable clamping nut 69 threadably engaged upon the end of the conduit 65. The other end of the glass indicator tube 67 is connected to a conduit comprising an elbow member 71 which connects into the side wall of the reservoir 3.

In operation, the lubricant or other fluid to be distributed is placed in the reservoir 3 which may be closed by a suitable cover 73. The operator by manipulating the handle 47 imparts an oscillatory movement to the gear 37 thereby simultaneously actuating the pistons 23 and 25 in opposite directions in their guiding apertures. As each piston uncovers its associated fluid inlet passage 9 or 11, a charge of the fluid is sucked into the left hand end of its piston guiding aperture. As each piston is forced to the left hand end of its aperture, it discharges the charge of fluid received therein through its associated discharge outlet 15 or 17 respectively. Consequently the conduits 19 and 21 alternately receive quantities of fluid discharged under high pressure from the pump.

Assuming the handle 47 on the pump is moved so that the conduit 19 is receiving a high pressure impulse, the valve piston 54 will be lifted to the uppermost position, as shown in Fig. 6. In this position, the charge of fluid passes into the aperture 53 and thence outwardly through the line port 62 into the end 52 of an associated fluid distributing system.

After the lubricant has passed completely around the line circuit and actuated all the feeders disposed therein for lubricating the associated bearings, the fluid is thereafter by-passed in the usual manner. The by-passed fluid returning from the other end of the line 50 enters the line port 61, passes along the valve guiding aperture 53 around the restricted portion of the valve 54 and thence out of the discharge port 57, returning through fluid receiving conduit 65. From the conduit 65, the fluid passes through the flow indicating device 67 and thence into the reservoir 3 of the pump.

When the handle 47 on the pump is moved in the opposite direction, the piston 25 is drawn outwardly on its successive stroke to suck in a new charge and the piston 23 is forced to the left to apply high pressure discharge of fluid through the conduit 21 into the upper end of the device 51. The valve piston 54 is now moved to its lowermost position for passing the high pressure fluid through the line port 61 into the end 50 of the fluid distributing line. After distribution around the system, the by-passed fluid returns into the control device through the lower line port 62 thence out of the discharge port 57. The by-passed fluid now returns through the fluid flow indicator 67 to the reservoir 3 of the pump.

The fluid flow indicator 67 thus gives the operator a manifestation of the successful operation of the pump and system every time it operates to force fluid through the system in either direction.

It will be seen that I have provided a manually operable fluid circulating pump of simple construction for use with single-line flow-reversing fluid distributing systems comprising a flow indicator and having a minimum number of moving parts.

Aside from the specific embodiment of the invention herein shown and described, it will be understood that numerous details of the construction may be altered or omitted without departing from the spirit and scope of the invention as disclosed and claimed and that I do not desire to limit the invention to the exact details of the construction herein set forth.

I claim—

1. A fluid circulating device for single-line reverse-flow distributing systems having in combination, a body having two discharge outlets, a fluid receiving conduit, a pump in said body for pumping fluid from said discharge outlets alternately, and an automatic device responsive to the fluid discharge from said outlets for connecting the instant discharging outlet to a corresponding end of an associated distributing line and for simultaneously connecting the other end of the line to the fluid receiving conduit on said device for returning the by-passed fluid from the distributing line.

2. A fluid circulating device for single-line reverse-flow distributing systems having in combination, a body, a fluid reservoir thereon, a flow indicator, a fluid receiving conduit for passing fluid into said reservoir through said flow indicator, two discharge outlets in said body, a double acting pump for discharging fluid from said reservoir through said discharge outlets alternately and an automatic device responsive to the fluid discharged from said outlets for connecting the instant discharging outlet to a corresponding end of a single line distributing system and for simultaneously connecting the other end thereof to the fluid receiving conduit for passing the by-passed fluid through said indicator into the reservoir.

3. A fluid circulating device for single-line reverse-flow distributing systems having in combination, a body, a fluid indicator, a fluid receiving conduit for passing fluid into said reservoir through said flow indicator, two discharge outlets in said body, a pair of pistons slidable in said body for pumping fluid from said reservoir through said discharge outlets, manually actuable means for operating said pistons simultaneously to discharge fluid alternately from the outlets, and an automatic device responsive to the fluid discharged from said outlets, said device comprising valve means for connecting the instant discharge outlet to a corresponding end of a single line distributing system and for simultaneously connecting the other end of an associated system to the fluid receiving conduit for passing the by-passed fluid through said indicator into said reservoir.

4. A fluid circulating device for single-line reverse-flow distributing systems having in combination, a body, a fluid reservoir thereon, a flow indicator, a fluid receiving conduit for passing fluid into said reservoir through said flow indicator, two piston guiding apertures extending through said body, an inlet conduit connecting from the reservoir to each aperture, a discharge outlet from each aperture, a piston slidably disposed in each aperture for pumping fluid from the reservoir through the associated discharge outlet, manually actuable means for operating said pistons simultaneously to discharge fluid alternately from the discharge outlets, and an automatic device responsive to the fluid discharged from said outlets, said device comprising valve means for connecting the instant discharging outlet to a corresponding end of an associated single line distributing system and for simultaneously connecting the other end of the line to the fluid receiving conduit for sending by-passed fluid through said flow indicator to the reservoir.

5. A fluid circulating device for single-line reverse-flow distributing systems having in combination, a body, a fluid reservoir thereon, a flow indicator, a fluid receiving conduit for passing fluid into said reservoir through said flow indicator, two piston guiding apertures extending through said body under the reservoir, an inlet conduit connecting from the reservoir to an intermediate portion of each aperture, discharge outlets opening from the adjacent ends of the apertures, a piston slidably disposed in each aperture for pumping fluid from the reservoir through said discharge outlets, manually actuable means for operating said pistons simultaneously in opposite directions for discharging fluid alternately from said outlets, and an automatic device responsive to the fluid discharged from said outlets, said device comprising valve means for connecting the instant discharge outlet to a corresponding end of a single line distributing system and for simultaneously connecting the other end of the line to the fluid receiving conduit for returning by-passed fluid through said indicator to the reservoir.

6. A fluid circulating device for single-line reverse-flow distributing systems having in combination, a body, a fluid reservoir thereon, two discharge outlets in said body, a double acting pump for discharging fluid from said reservoir through said discharge outlets alternately, a flow indicator, a fluid receiving conduit for receiving fluid by-passed through a single line distributing system and passing it through said flow indicator to said reservoir, an automatic device responsive to the fluid discharged from said outlets, said automatic device comprising a tubular body having a valve guiding aperture extending therethrough, an inlet port at each end of the aperture, a discharge port connecting from said aperture in the middle of the body, two line ports connecting from the aperture at axially spaced points therein, conduits connecting said inlet ports with the pump discharge outlets, and a dumb-bell valve piston slidably disposed for reciprocation in said guide aperture in response to the injection of fluid from the pump discharge outlets into either inlet port for connecting said inlet port to the adjacent line port to pass the injected fluid therethrough to the connected end of an associated line, and for simultaneously connecting the other line port with said discharge port whereby fluid by-passed through the line is conducted through said flow indicator into the reservoir.

7. A fluid circulating device for single-line reverse-flow distributing systems having in combination, a body, a fluid reservoir thereon, a flow indicator, a fluid receiving conduit for returning fluid to said reservoir through said flow indicator, two discharge outlets in said body, a pair of pistons slidable in said body for pumping fluid from said reservoir through said discharge outlets, manually actuable means for operating said pistons simultaneously to discharge fluid alternately from said outlets, an automatic device responsive to the fluid discharged from said outlets comprising a tubular body having a valve guiding aperture extending therethrough, a discharge port connecting from the aperture in the middle of said body, two line ports spaced axially along said body and connecting from said aperture, a dumb-bell valve piston slidably disposed for reciprocation in said guiding aperture to connect either line port through the adjacent end of the aperture whilst connecting the other line port through the discharge port, conduit means connecting the discharge outlets of the pump responsively into opposite ends of the valve guiding aperture, means connecting said fluid receiving conduit with the discharge port in said valve aperture whereby the quantities of fluid discharged alternately from said pump outlets are applied successively in opposite directions through an associated distributing system and the by-passed fluid is returned to the reservoir through said fluid flow indicator.

8. In a control device for delivering fluid alternately into either end of a distributing line whilst connecting the other end of the line through a fluid receiving conduit, the combination of a tubular body having a valve guiding aperture extending therethrough, an inlet port at each end of said aperture, two line ports connecting from said aperture at spaced positions along the side of the body for connection with the ends of a line, a discharge port connecting from said aperture in the middle of said body, and valve means slidably disposed in said aperture for reciprocation by the injection of fluid into either inlet port for conducting the injected fluid to the adjacent one of the line ports while simultaneously connecting the other line port to the said discharge port.

9. In a control device for delivering fluid alternately into either end of a distributing line whilst connecting the other end of the line through a fluid receiving conduit, the combination of a tubular body having a valve guiding aperture extending therethrough, an inlet port at each end of said aperture, two line ports connecting from said aperture at spaced positions along the side of the body for connection with the ends of a line, a discharge port connecting from said aperture in the middle of said body, a valve piston slidably disposed in said aperture for reciprocation by the injection of fluid into either inlet port for connecting the injected fluid into the adjacent one of the line ports while simultaneously connecting the other line port to the discharge port, said valve piston comprising two piston heads of a suitable axial dimension for disposition between the discharge port, the line ports and the inlet ports respectively, and a reduced interconnecting member for spacing the piston heads a distance substantially equal to the spaced distance between said inlet ports.

DAVID R. HILLIS.